UNITED STATES PATENT OFFICE.

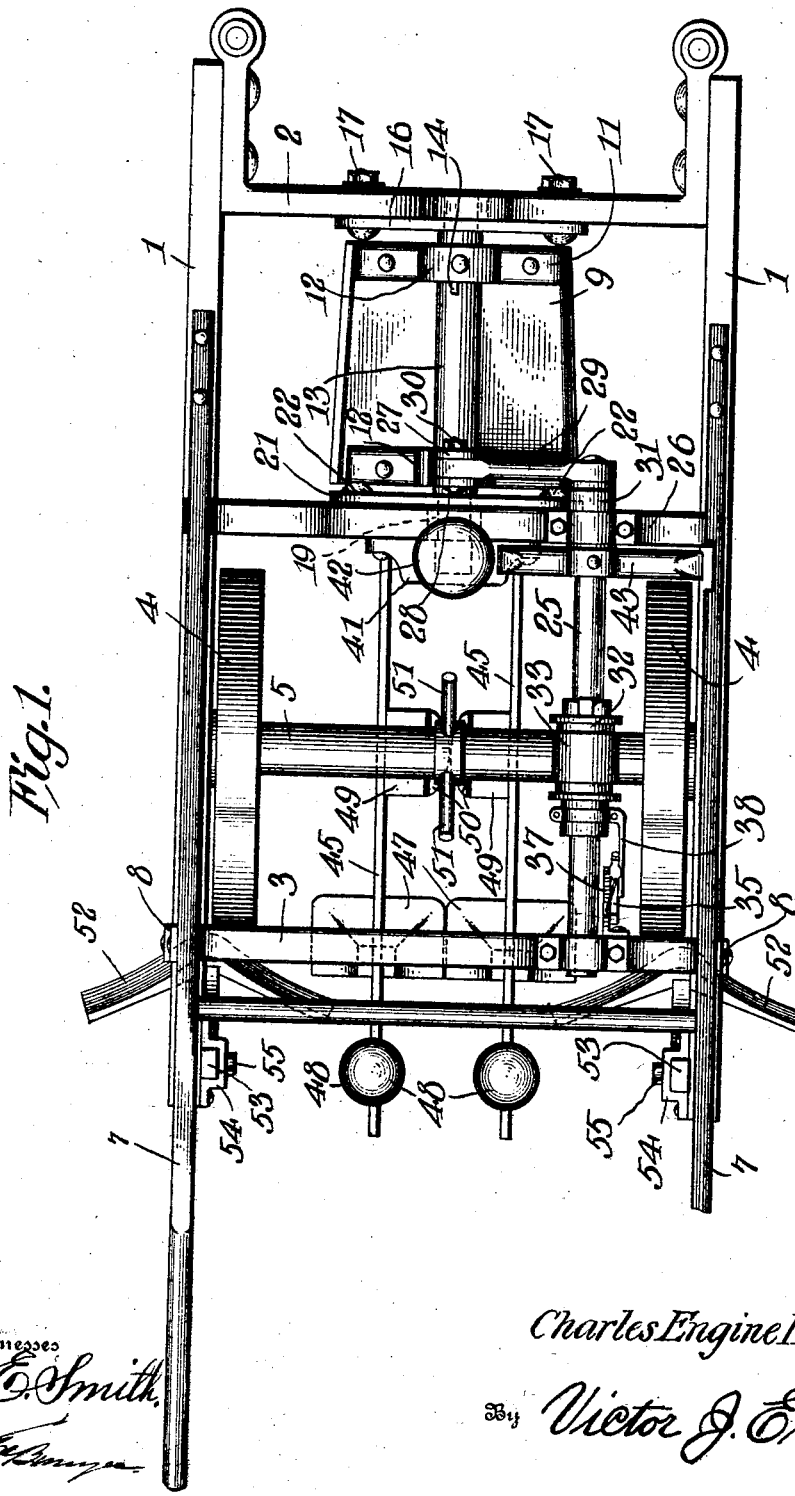

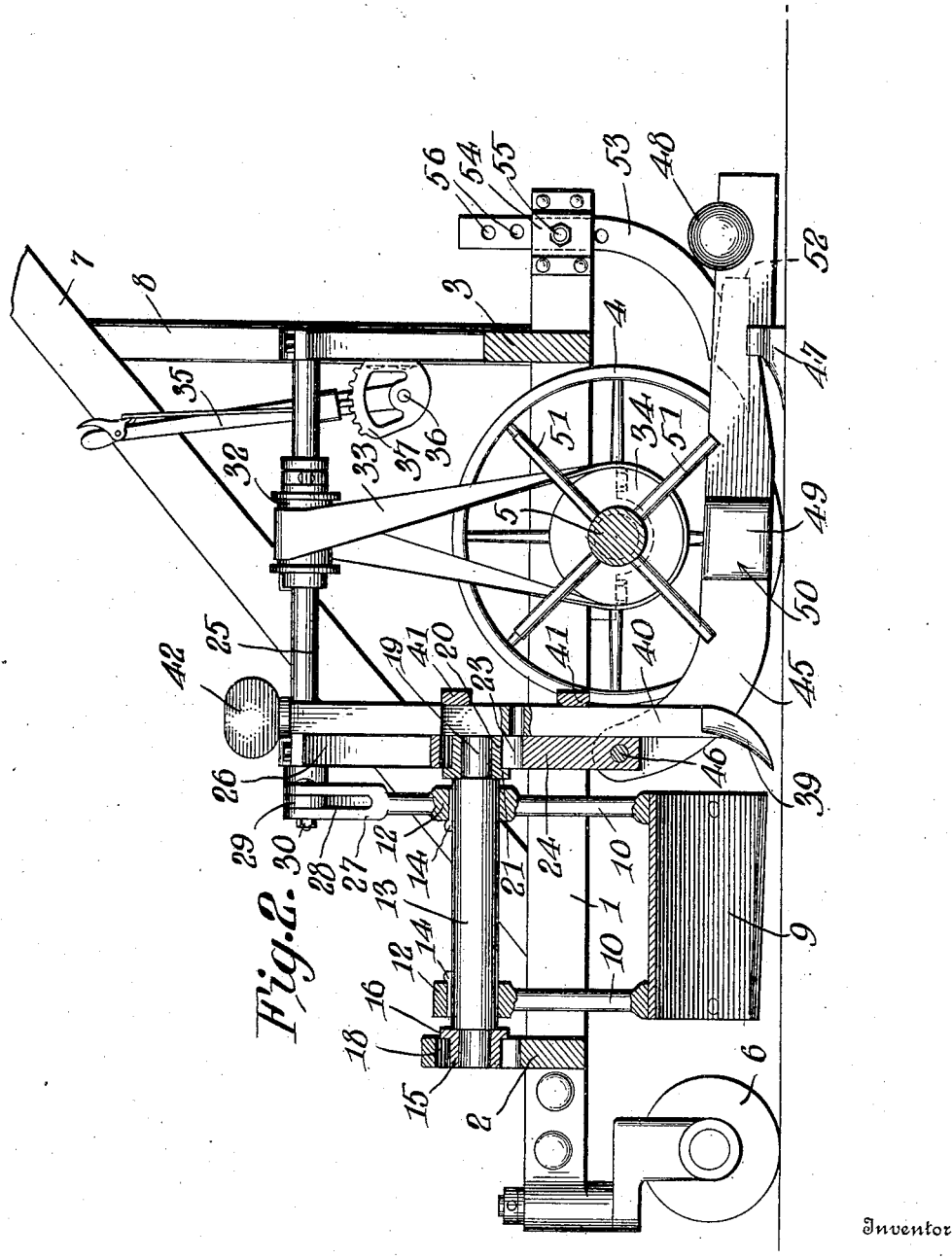

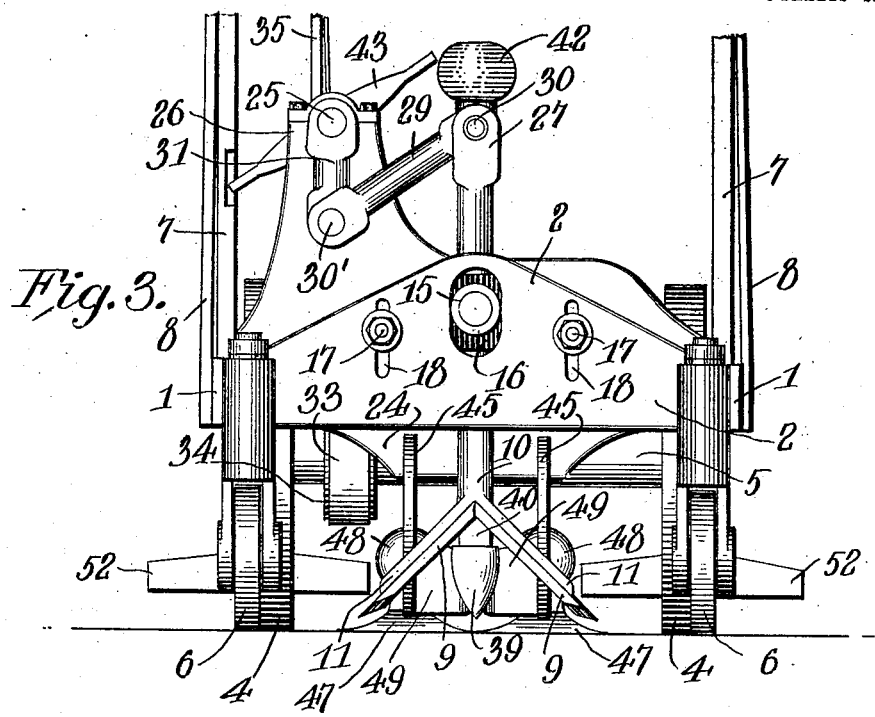
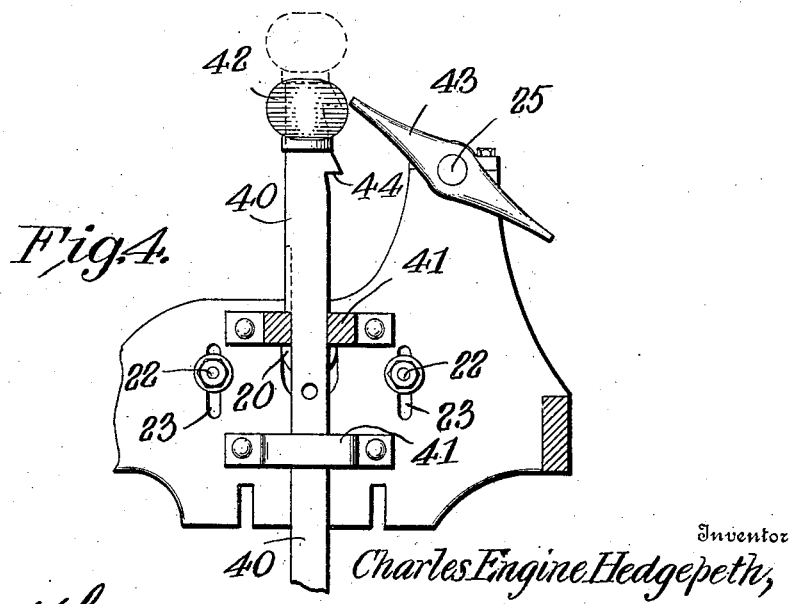

CHARLES ENGINE HEDGEPETH, OF NASHVILLE, NORTH CAROLINA.

COTTON-CHOPPER.

No. 904,427.  Specification of Letters Patent.  Patented Nov. 17, 1908.

Application filed January 31, 1908. Serial No. 413,671.

*To all whom it may concern:*

Be it known that I, CHARLES ENGINE HEDGEPETH, a citizen of the United States of America, residing at Nashville, in the county of Nash and State of North Carolina, have invented new and useful Improvements in Cotton-Choppers, of which the following is a specification.

This invention relates to cotton choppers, and one of the principal objects of the same is to provide a cotton chopper in which the hoes are reciprocated laterally to form the stands.

Another object is to provide a cotton chopper with a vertically reciprocating tooth for use in rocky ground where it would be impossible to use a hoe.

Still another object of the invention is to provide a pair of reciprocating grass cutters to follow the hoes, said grass cutters being mounted upon pivoted levers, and means for moving said levers laterally to cut the grass away from the stands.

These and other objects may be attained by means of the construction illustrated in the accompanying drawings, in which:—

Figure 1 is a plan view of a cotton chopper made in accordance with my invention. Fig. 2 is a longitudinal section of the same. Fig. 3 is a front end elevation of the machine. Fig. 4 is a detail elevation and partial section showing the vertically reciprocating bar for carrying the tooth.

Referring to the drawings for a more specific description of my invention, the numeral 1 designates the side bars of the frame connected in front by a cross bar 2 and in the rear by a cross bar 3. This frame is mounted upon ground wheels 4 fixed to an axle 5, while in front of the frame is a pair of caster wheels 6. Rising from the frame is a pair of handles 7 supported in the rear by uprights 8. The hoes 9 consist of flat blades, the rear ends of which are wider than the front ends, as shown more particularly in Fig. 2. These hoes are secured to standards 10, said standards having diverging arms 11 to which the hoe blades are secured. The upper ends of the standards 10 are provided with eyes 12 fitted to a shaft 13 by means of splines 14, or other suitable means. The shaft 13 at its front end is reduced in size and journaled in a collar 15 formed upon a plate 16 which is adjustable vertically by means of bolts 17 passing through slots 18 in the cross bar 2. At the rear end of the shaft 13 the reduced portion 19 of the shaft is mounted in a collar 20 formed upon a plate 21 adjustable by means of bolts 22 in a manner similar to the front end of said shaft, said collar 20 being mounted in a slot 23 in a bar 24 on the frame.

A shaft 25 is journaled in an upright portion 26 of the bar 24, and in a similar upright portion connected to the cross bar 3. A connecting rod 27 formed as a continuation of one of the standards 10 is slotted, as at 28, and a pitman 29 is pivoted in the said slot by means of a bolt 30. The opposite end of said pitman 29 is pivoted at 30' to a crank 31 connected to the end of the shaft 25. The shaft 25 carries a grooved pulley 32, around which passes a belt 33, said belt also passing around a pulley 34 on the axle 5. A lever 35 pivoted at 36 to a rack 37 is connected by means of an arm 38 to the sleeve or pulley 32. The pulley 32 is mounted to slide on the shaft 25 and is connected to said shaft by a spline which permits the pulley to rotate freely on said shaft. Thus when the lever 35 is moved toward the rear the pulley 32 is made to run free on the shaft 35 and thus throw the hoes out of operation.

A tooth 39 connected to a standard 40 mounted to slide in keepers 41 is utilized in rocky places where hoes would not operate properly. On the upper end of the standard 40 is a weighted ball 42, and the standard is alternately raised and permitted to drop by means of a two-armed lever 43 mounted on the shaft 25, said two-armed lever adapted to come into contact with a projection 44 on the standard 40 to raise the standard and to permit the same to drop after the lever has passed the projection 44.

A pair of curved levers 45 disposed in parallel relation and pivoted at 46 carry grass cutter blades 47 having sharp edges around three sides thereof, as shown more clearly in Fig. 1. The levers 45 are provided with weights 48 at their rear ends, and at a point in front of the cutter blades 47 inwardly projecting cams 49 are provided, said cams having rounded ends 50. To reciprocate the levers 45 laterally and thus give to the blades 47 a lateral vibration arms 51 connected to the axles 5 are mounted to pass between the cams 49 to spread the levers 45 apart, while the resiliency of said levers return the same to their normal position. Plows or shovels 52 are mounted upon curved standards 53 adjustably secured to the frame by means of a keeper 54 and a bolt 55 passing through said keeper and through any one of a series of notches 56 formed in said standards.

The operation of my invention may be briefly described as follows: As the machine is drawn across the rows of cotton the rapid movement of the hoes will cut the cotton clean and leave the stands at regular intervals. The blades 47 are reciprocated to cut the grass out of the line between the stands and around the stands, and the plows throw up fresh dirt to the stands. Whenever it is required to throw out of operation the hoes and the cutter blades to save a stalk on a skip place, the lever 35 is operated.

Having thus described the invention, what is claimed as new, is:—

1. In a cotton chopper a frame, drive wheels for said frame, a pair of hoes, standards having diverging lower ends to which said hoes are secured, a rock shaft, said standards being secured to said rock shaft, means for adjusting said rock shaft vertically, an arm formed on one of said standards, a pitman pivoted to said arm, a crank to which said pitman is pivoted, a shaft to which said crank is connected, a pulley on said shaft, an axle, a pulley on said axle, and a belt passing around said pulleys.

2. In a cotton chopper, the combination of hoes, means to reciprocate said hoes and a grass cutter comprising parallel levers pivoted to the frame and provided with weighted rear ends, cutter blades secured to said levers, and means for laterally vibrating said levers.

3. In a cotton chopper, the combination of hoes, means for oscillating said hoes, a pair of grass cutters having cutting edges at the front and sides thereof, levers pivoted in parallel relation, said grass cutters being carried by said levers, weights at the rear ends of said levers, cams on the inner surfaces of said levers, an axle, a series of arms connected to said axles, said arms passing between said cams to vibrate said levers and cutters, and means for rotating said axle.

In testimony whereof I affix my signature in presence of two witnesses.

CHARLES ENGINE HEDGEPETH.

Witnesses:
R. A. P. COOLEY,
M. W. LINCKE.